(12) United States Patent
Spring

(10) Patent No.: US 7,378,985 B2
(45) Date of Patent: May 27, 2008

(54) COMMUNICATION SYSTEM FOR DOWN HOLE USE

(76) Inventor: Gregson William Martin Spring, 7 Great Calcroft, Defford Road, Pershore, Worcestershire WR10 1QS (GB)

( * ) Notice: Subject to any disclaimer, the term of this patent is extended or adjusted under 35 U.S.C. 154(b) by 187 days.

(21) Appl. No.: 10/538,309

(22) PCT Filed: Jan. 7, 2003

(86) PCT No.: PCT/GB03/00027

§ 371 (c)(1),
(2), (4) Date: Jun. 9, 2005

(87) PCT Pub. No.: WO2004/061269

PCT Pub. Date: Jul. 22, 2004

(65) Prior Publication Data

US 2006/0022840 A1    Feb. 2, 2006

(51) Int. Cl.
*G01V 1/00* (2006.01)
(52) U.S. Cl. ............... 340/854.3; 340/855.8; 322/14
(58) Field of Classification Search .......... 322/14, 322/13, 11, 44; 310/10, 11, 40 R, 77, 93, 310/113; 340/855.8
See application file for complete search history.

(56) References Cited

U.S. PATENT DOCUMENTS 3,828,867 A * 8/1974 Elwood .............. 175/45

| 4,739,325 | A  |   | 4/1988 | MacLeod |
| 5,517,464 | A  | * | 5/1996 | Lerner et al. ............ 367/84 |
| 6,396,276 | B1 |   | 5/2002 | Van Steenwyk et al. |
| 6,426,917 | B1 |   | 7/2002 | Eckersley et al. |

FOREIGN PATENT DOCUMENTS

WO    WO0212676    2/2002

OTHER PUBLICATIONS

International Search Report Oct. 9, 2003.

* cited by examiner

*Primary Examiner*—Albert K. Wong
*Assistant Examiner*—Hung Q. Dang
(74) *Attorney, Agent, or Firm*—Ira S. Dorman

(57) ABSTRACT

A communication system for down hole use and comprising a drill collar (101) comprising a first portion (103) and a second portion (105) separated from each other by an electrically insulating material (67) and means (22, 63, 77, 81) for generating an electrical signal and for applying the electrical signal to the drill collar (101) such that the electrical signal is transmitted into a geological formation being drilled, characterized in that the means for generating the electrical signal comprises an alternator (22, 63, 77, 81) and means (2, 4, 10) responsive to an electrical output of the alternator for regulating rotation of the alternator.

18 Claims, 14 Drawing Sheets

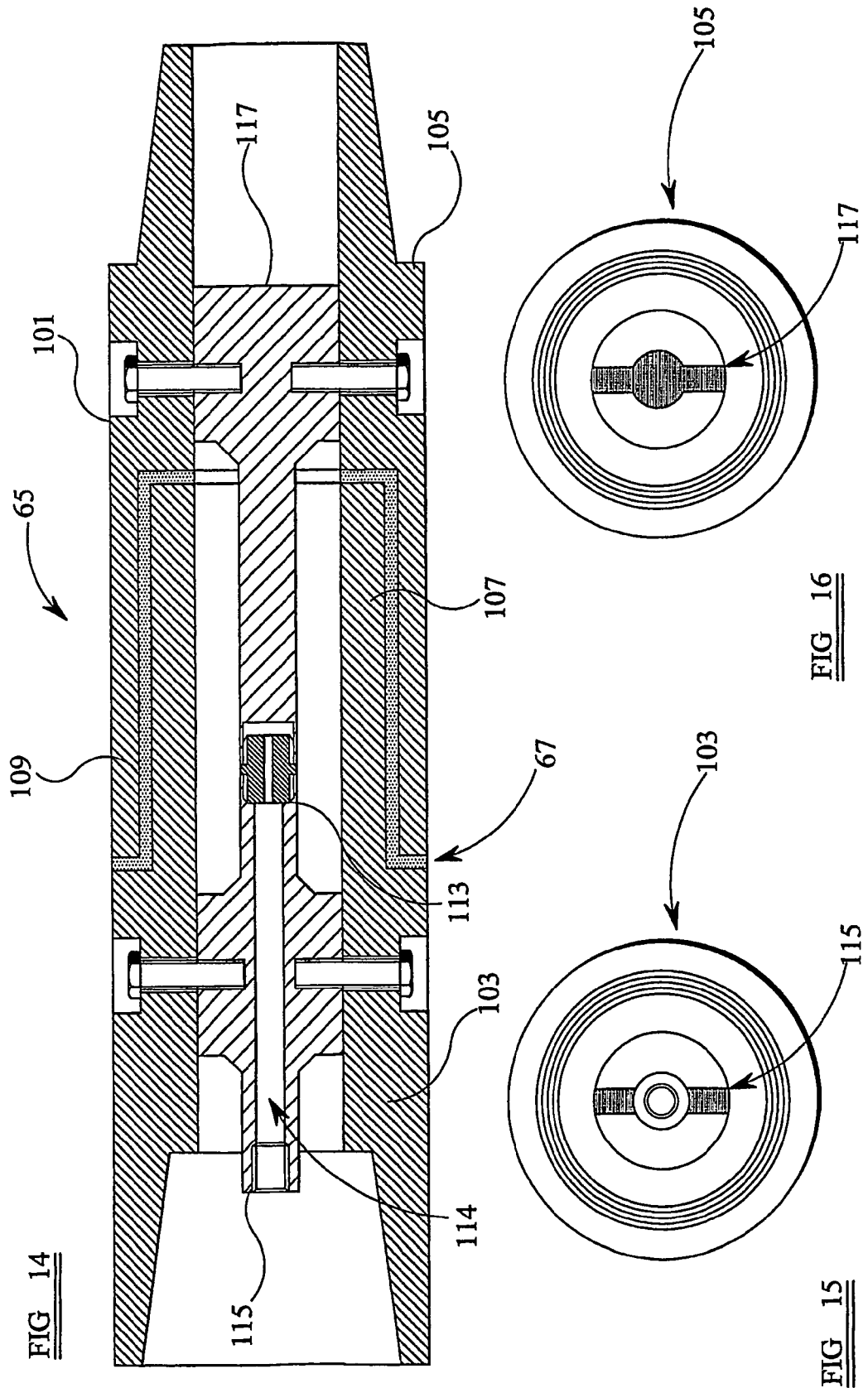

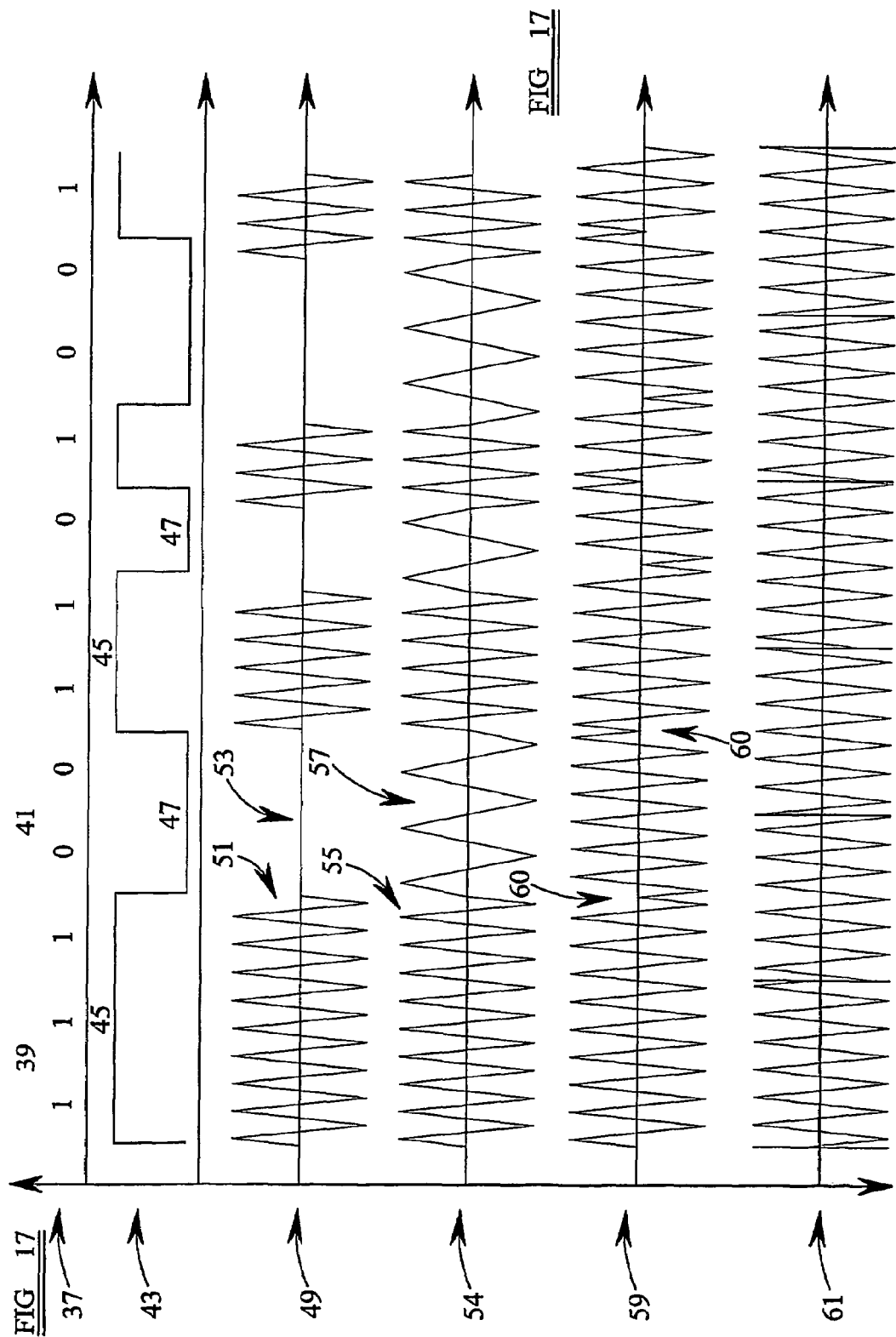

COMMUNICATION SYSTEM FOR DOWN HOLE USE

This invention relates to a communication system for down hole use in drilling applications. More particularly, but not exclusively, the invention relates to the use of an alternator and a gapped sub region of a drill string for use in communication between down hole and surface instrumentation.

In oil field drilling applications, it is a requirement of down hole instrumentation to be able to transmit, for example by telemetry, survey data and various parameters of a geological formation being drilled back to the surface. The most common method to achieve this telemetry process has been to apply pressure pulses to a mud flow which is pumped down from the surface by powerful mud pumps to perform a number of duties including drill string lubrication, formation coating, drill bit cooling and removal of drill cuttings back to the surface. The pressure pulses are applied to the mud by partially interrupting the rate of the mud flow, for example by means of a poppet valve close to the end of the drill string furthest from the surface, in a manner known to a person skilled in the art.

The pressure pulses generated are coded forms of the instrumented data and are detected at the surface using differential pressure transducers. This technique for communication between the down hole instrumentation and the computers at the surface has been exploited relatively successfully for approximately fifty years. However, changes in drilling practice now prevent this technique from being employed in a number of drilling applications. For example, a new drilling method called, Under Balanced Drilling, lowers the density of the drilling mud by pumping relatively large quantities of nitrogen gas into the drilling mud. The addition of the nitrogen gas has the disadvantage of making the drilling mud compressible. As a result the compressible drilling mud is unable to transmit pressure wave pulses back to the surface.

To overcome the limitation of compressible mud for transmitting pulse waves, electromagnetic methods of communication have been used to replace the mud pulse method, for example, the gapped sub method. A gapped sub is a short length of a drilling collar, in a drill string, with an electrically insulating gap inserted across its length to allow a signal voltage to drive a signal current across the insulating gap and into the geological formation through which the drill string is passing. Once down hole, the drill string contacts the formation at one or more places either side of the gap and current flows from one side of the signal generator into the formation at one of the points of contact and back to the other side of the signal generator at another point of contact the other side of the gap. Whilst most of the signal current returns to the gapped sub without being detected, some of the signal current travels through the formation and reaches the surface and is detected by relatively sensitive amplifiers to allow survey and formation information to be decoded and recorded by means of computers.

There are many encoding schemes that are applied to original digital survey data to allow it to be transmitted successfully to the surface. It is known that sub surface geology has a severe effect on the received strength of a signal originating from sub surface or down hole instruments. It is accepted by a person skilled in the art that communication depth is inversely proportional to frequency. Due to natural phenomena, the available frequencies for down hole to surface communication are limited from about 1 Hz to about 40 Hz. The lower limit is created by low frequency signal detection difficulties and the presence of natural low frequency phenomena. The upper limit is created by the presence of strong interference signals from 50 Hz and 60 Hz mains power sources.

Due to the limited frequency bandwidth, down hole to surface communication techniques have evolved to exploit a number of different schemes of encoding survey and formation data. However, they primarily fall into one of four categories, for example Amplitude Shift Keying (ASK), Frequency Shift Keying (FSK), Phase Shift Keying (PSK) or Pulse Position Modulation (PPM).

Amplitude Shift keying (ASK) varies the amplitude of a carrier wave in response to a digital data stream and assigns, for example, maximum amplitude for a logical high and zero amplitude for a logical low. By this means, the presence of a digital stream is measured by the presence or absence of the carrier wave. The original digital data may be recovered by using timing information buried in the carrier wave to reconstruct the original survey data.

Frequency Shift Keying (FSK) assigns one frequency to a logical high and another frequency to a logical low. By this means, digital data may be sent to the surface by transmitting an alternate series of frequencies that exactly mimic the original data. The surface amplifiers detect these frequencies and recover the original survey and formation data by decoding the frequencies back into the original digital data.

Phase Shift Keying (PSK) assigns logical values to the relative phase of a single frequency and in its simplest form uses 0 degrees to 180 degrees to mean a logical high, and 180 degrees to 360 degrees to mean a logical low. Phase Shift Keying has the advantage of being able to offer higher coding efficiency by, for example, assigning data bits 00 to phase 0 degrees to 90 degrees, data bits 01 to phase 90 degrees to 180 degrees, data bits 10 to phase 180 degrees to 270 degrees, and data bits 11 to phase 270 degrees to 360 degrees. This coding is known as Quadrature Phase coding. Quadrature Phase coding is relatively complicated, and hence more difficult, to engineer into a reliable piece of drilling apparatus.

Pulse Position Modulation (PPM) is similar to Amplitude Shift Keying (ASK) except more emphasis is assigned to the relative time intervals between detected pulses. The original digital survey data is encoded as time intervals between pulses and may be decoded on the surface by accurately measuring the time intervals to reconstruct the original digital survey data. This communication method is slower than any of the hereinabove mentioned methods, but it is very power efficient.

In the case of electromagnetic telemetry, an electronic signal generator is used to produce the signal voltage across the gapped sub for the above coding schemes. Because the signal generator is powered by batteries, the signal generator has a limited power output which will limit the range over which communication can be achieved. The use of batteries limit the time available for communication, for example less than 100 hours. Therefore, a communication system is required which is not limited in both power and time.

Down hole alternators are used to generate electrical power for down hole drilling instrumentation. Down hole alternators derive their primary power from a mud turbine, which rotates in response to the linear flow of the mud down the centre of the drill string.

All mud alternators effectively run open loop. This means that the output voltage of the mud alternator is entirely dependant on the mud flow rate and is zero when there is no mud flow and at a maximum when the mud flow is at its maximum. This highly variable output voltage characteristic is completely unsuitable for drilling instrumentation, and especially unsuitable for use in electromagnetic telemetry techniques.

It is an object of the present invention to provide a communication system capable of fulfilling at least some of the above requirements.

According to the present invention there is provided a communication system for down hole use and comprising a drill collar comprising a first portion and a second portion separated from each other by an electrically insulating material and means for generating an electrical signal and for applying the electrical signal to the drill collar such that the electrical signal is transmitted into a geological formation being drilled, wherein the means for generating the electrical signal comprises an alternator and means mechanically connected to the alternator, the means being responsive to an electrical output of the alternator for regulating rotation of the alternator.

The means responsive to the electrical output of the alternator may comprise a torque generating apparatus which generates torque or a torque reaction in response to the electrical output of the alternator and which transmits such torque to the alternator for regulating rotation thereof.

The torque generating apparatus may comprise a first assembly including a generally cylindrical member of magnetically soft material and having a longitudinal axis, a second assembly arranged coaxially within the first assembly and including an electromagnetic winding, the first assembly and the second assembly being rotatable relative to each other about the axis, the arrangement being such that relative rotation between the first and second assemblies induces a magnetic field which generates rotational torque between the first and second assemblies.

A "magnetically soft material" is a material which is not capable of being substantially permanently magnetised, but which becomes magnetised whilst in an externally applied magnetic field.

The first assembly may be a rotor assembly of the torque generating apparatus for producing rotational torque and the second assembly may be a stator assembly of the torque generating apparatus.

Rectification means may be provided to convert the electrical output from the alternator to provide D.C. current to the electromagnetic windings of the torque generating apparatus to generate an electromagnetic braking effect.

The second assembly may comprise a magnetically soft steel.

The first and second assemblies may be separated by a narrow gap.

The first assembly may be disposed so as substantially to surround the second assembly.

The first assembly may be substantially solid or may be formed from a plurality of laminations.

The second assembly may be substantially solid or may be formed from a plurality of laminations.

The first and second assemblies may define therebetween a substantially annular space for the passage of a fluid.

The torque generating apparatus may comprise a plurality of longitudinal grooves provided in an inside surface of the cylindrical member, the longitudinal grooves may be adapted to prevent an aggregation of particulate matter from the fluid flowing between the first and second assemblies.

The grooves may be provided so as to form at least a partial helix around the longitudinal axis of the first assembly.

The second assembly may be provided with a number of pole pieces extending generally radially from the longitudinal axis thereof. The pole pieces of the second assembly may be provided with an electromagnetic winding, adjacent poles being magnetisable in opposite directions. Means may be provided to control the degree of the magnetisation. Gaps between the pole pieces may be filled with a potting material. The surface of the second assembly may be covered with a layer of soft magnetic or non magnetic material.

The first assembly may be provided with external rotation means such as impeller means adapted to rotate the first assembly, the impeller means being adapted to be disposed in use within a moving fluid, the motion of the fluid acting upon the impeller means so as to rotate the first assembly.

The torque generating apparatus and the alternator may be provided on a common shaft.

The alternator may be provided with external rotation means, such as impeller means adapted to rotate the alternator, the impeller means may be adapted to be disposed in use within a moving fluid, the motion of the fluid acting upon the impeller means so as to rotate the alternator. The impeller means may be an integral part of a magnet carrier of the alternator.

The electrical output of the alternator may be connected indirectly to the electromagnetic winding of the torque generating apparatus by way of alternator voltage regulation means to create the electromagnetic braking effect.

The alternator voltage regulation means may function to provide a progressive braking effect and/or to effect braking at a predetermined set point. The predetermined set point may be determined by a switch mode controller. The predetermined set point may be variable.

The regulated rotation of the alternator speed may produce a substantially constant output voltage signal from the alternator.

The regulated rotation of the alternator may produce a substantially constant output frequency signal from the alternator.

At least one switch, for example a semiconductor or electromechanical switch, may be provided for applying the electrical signal to the drill collar. A microprocessor may be provided to control the at least one switch.

The electrical signal may comprise coding means to transmit data to receiving means at a region outside the geological formation. The coding means may be selected from Amplitude Shift Keying, Frequency Shift Keying, Pulse Position Modulation and/or Phase Shift Keying.

The receiving means may comprise at least one amplifier and/or timing means and/or at least one microprocessor.

The communication system may comprise at least one transformer such that the impedance of the output of the alternator can be altered, for example to match the impedance of the formation.

For a better understanding of the present invention and to show more clearly how it may be carried into effect, reference will now be made, by way of example, to the accompanying drawings which show schematically various embodiments of the present invention. The figures may not be to scale. In the drawings:

FIG. 14 is a sectional view of a gapped sub forming part of a communication system according to the present invention;

FIG. 15 is an end view of an upper end of the gapped sub of FIG. 14;

FIG. 16 is an end view of a lower end of the gapped sub of FIG. 14;

FIG. 17 is a representation of coding and transmission schemes utilised with a communication system according to the present invention;

Figure 1:
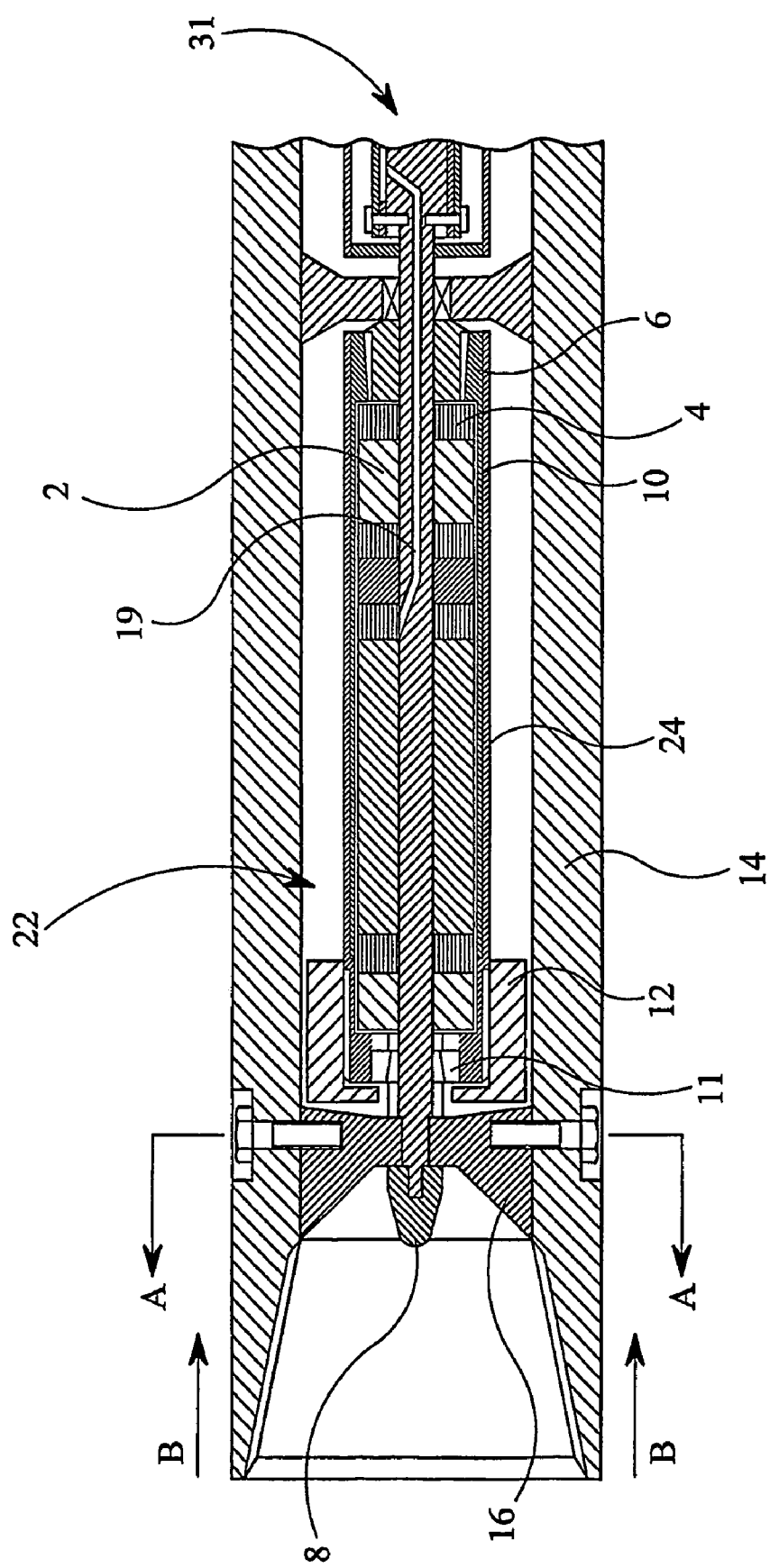
FIG. 1 is a cross sectional view of an embodiment of a combination of an alternator and torque generating apparatus arrangement forming part of a communication system according to the present invention.

FIG. 1 shows a combination of an alternator and a torque generating apparatus for down hole use in drilling applications. The torque generating apparatus comprises a second assembly in the form of a cylindrical stator 2. The stator 2 is shown in more detail in FIGS. 4 to 7. The stator is made of magnetically soft material and is provided with stator windings 4 arranged so that, when energised, the stator 2 is magnetised as discussed below. The stator is mounted on a fixed shaft 8. Surrounding the stator is a first assembly in the form of a magnetically soft steel rotor 10. The rotor 10 is mounted on the stator 2 by way of bearings 6, 11, such as thrust bearings. The rotor/stator assembly is contained within a cylindrical housing 14 which may typically be a section of drill collar. The assembly is supported by an anchor 16 which is bolted to the housing.

An alternator 22 is provided on the same shaft as the torque generating apparatus. The alternator 22 and the torque generating apparatus share a common rotor.

The stator windings 4 of the torque generating apparatus are connected to windings of the alternator by way of access holes 19 formed in the core of each apparatus as shown in FIG. 1.

In use, the combination is disposed down hole, drilling mud being pumped down the hole in the direction indicated by arrows B. The moving drilling fluid acts on the impeller 12 so as to rotate the rotor 10.

Mud alternators, such as the illustrated alternator 22, are electrical rotating machines connected to a rectifier 31 to convert the alternating current waveform into a single direct current supply. The impeller 12 is an integral part of a magnet carrier 24 of the alternator and spins at several thousand rpm in response to the flow rate of mud past the impeller. By electrically connecting the rectified output of the alternator 22 to the stator windings 4 of the torque generating apparatus, an electromagnetic brake is created between the torque generating apparatus and the alternator.

An alternator voltage and/or frequency regulator device, preferably with a switch mode controller 301 to minimise losses within the alternator voltage and/or frequency regulator device, is used to apply both linear and/or non linear braking characteristics to the alternator by way of the stator windings of the torque generating apparatus. Typical circuits shown in FIGS. 19, 21 and 23 comprise an alternator voltage and/or frequency regulator in the form of a programmable switch mode power supply controller 301 deriving power from the rectified alternator output and supplying programmed power output 303 to the stator windings 4 of the torque generating apparatus. A microprocessor 69 controls the switch mode controller 301. Below a certain reference voltage/frequency value, supplied by the microprocessor, the alternator runs open loop and there is no induction braking. Above the certain reference voltage/frequency value, the loop is closed and induction braking is applied to the alternator. In this manner a set point between open loop and closed loop control can be programmed at any chosen location on the alternator speed curve and may be tuned to vary the output voltage and/or frequency according to the requirements of different customers. The braking control loop involving the microprocessor 69, the switch mode controller 301 and the stator windings 4 is closed by means of braking feedback 305 from the windings to the microprocessor.

By coupling the alternator to a torque generating apparatus, the alternator no longer operates open loop and can be left to safely monitor its own output down hole. This down hole alternator needs only one design of impeller to reproduce all the likely voltages and/or frequencies that will be demanded from it in a drilling environment. A single combined alternator and torque generating apparatus can be programmed to reproduce the output voltage and/or frequencies corresponding to different impellers by limiting the speed of the rotor with induction braking. Such an arrangement reduces design and manufacturing costs, simplifies the operational needs of field engineers and improves the down hole reliability of the alternator and down stream instrumentation.

Figure 2:
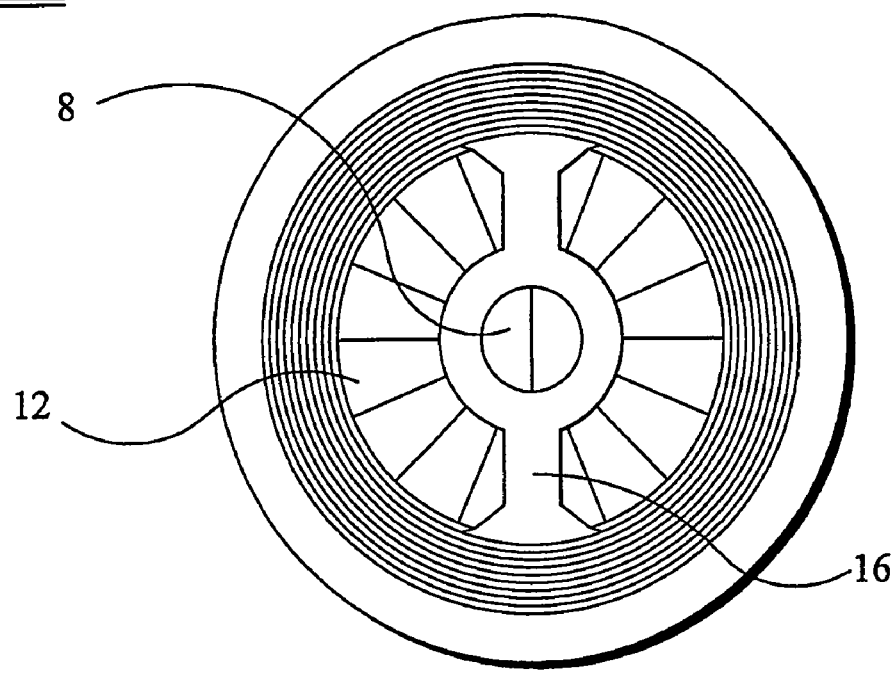
FIG. 2 is an end view of the combination of FIG. 1 looking in the direction of the arrow B.

FIG. 2 is an end view of the apparatus of FIG. 1. It shows the fixed shaft 8, anchor 16 and the impeller blades 12. The direction of mud flow in FIG. 2 is into the paper, causing rotation of the impeller blades.

Figure 3:
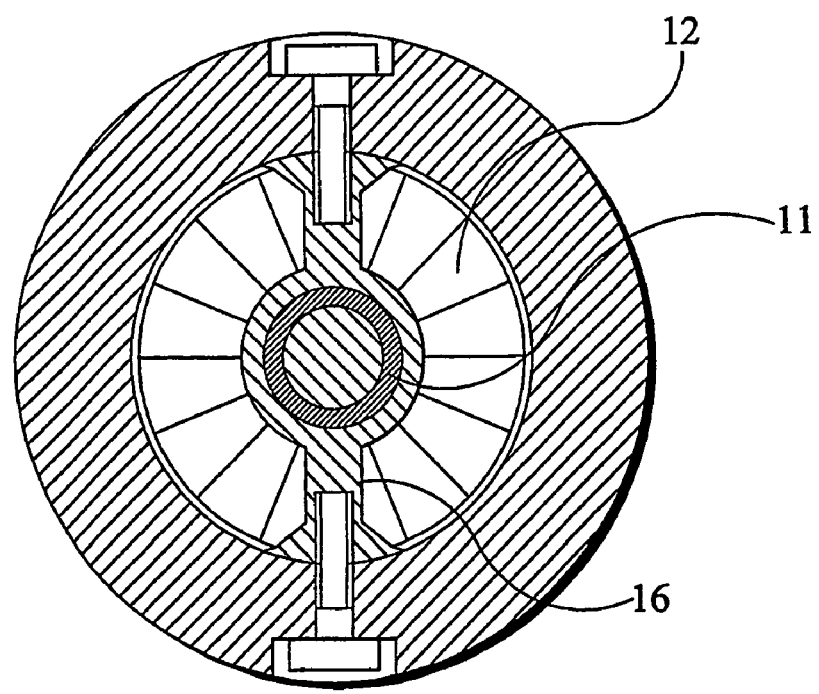
FIG. 3 is a cross sectional view of the combination of FIG. 1 taken along the line A-A.
Figure 4:
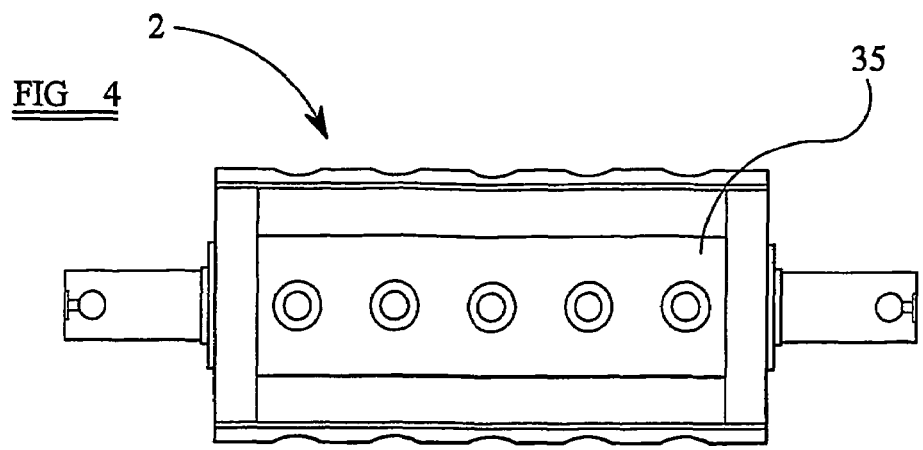
FIG. 4 is a more detailed view of a stator shown in FIG. 1.
Figure 5:
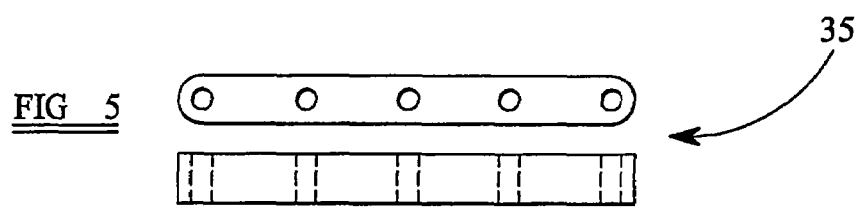
FIG. 5 shows two views of a stator pole piece.
Figures 6, 7:
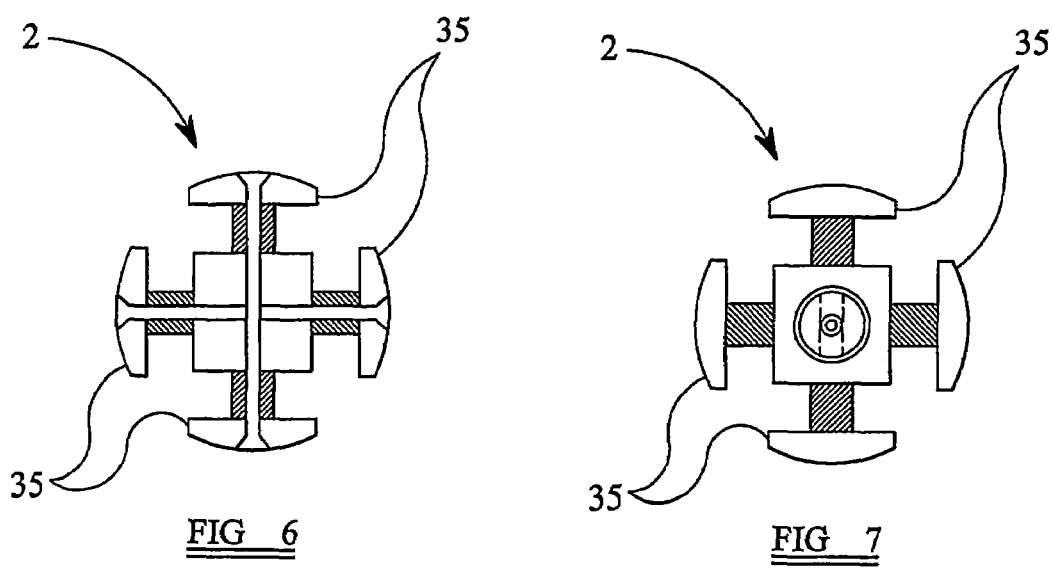
FIG. 6 is a cross section of the stator shown in FIG. 4.
FIG. 7 is an end view of the stator shown in FIG. 4.

FIG. 3 shows a cross sectional view as indicated in FIG. 1. The assembly anchor 16 is shown in cross section, bolted to the drill collar housing. The shaft 8 can be seen in cross section. The view in FIG. 3 is looking inwards into the assembly in the direction of the incoming mud, and the impeller blades 12 can be seen behind the assembly anchor 16.

FIGS. 4 to 7 are more detailed views of the stator assembly. The stator 2 of the torque generating apparatus is a simple four pole electromagnet which forms the electrical and mechanical centre of the machine. The stator 2 has a central shaft from which radially project four pole pieces 35, as shown. The number of pole pieces need not be limited to four. Any suitable number of pole pieces may be provided, larger machines requiring more pole pieces.

To prevent the stator 2 from being crushed by normal down hole drilling pressures, the gaps between the stator pole pieces may be filled with a high compressive strength material such as epoxy filler (not shown) to produce a solid, substantially cylindrical, stator. This allows the stator 2 to maintain its shape and survive pressures in excess of 20,000 pounds per square inch.

Figure 10:
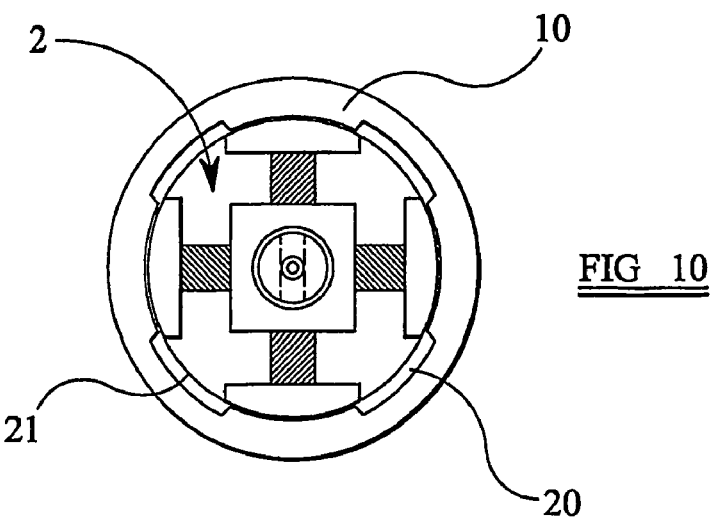
FIG. 10 is an end view detail of the rotor and stator assembly.

The stator 2 of the torque generating apparatus is wound with high temperature resistant enamelled copper wire (not shown in FIGS. 4 to 7) so as to produce alternate north and south magnetisation of the pole pieces. To preserve the integrity of the stator winding from the drilling mud, as shown in FIGS. 1 and 10 a thin sleeve of soft magnetic or non magnetic material 21 is machined to cover the stator windings. End cheeks provided on the stator receive the sleeve 21 and are welded thereto to seal the assembly. This seals the edges of the stator 2 and protects the contents from contamination. The covering, for example in the form of a cylinder, allows the stator poles to rotate with respect to the rotor 10 whilst maintaining close magnetic contact. A small magnetic gap is required to create the high output torque reactions from this machine.

Figure 8:
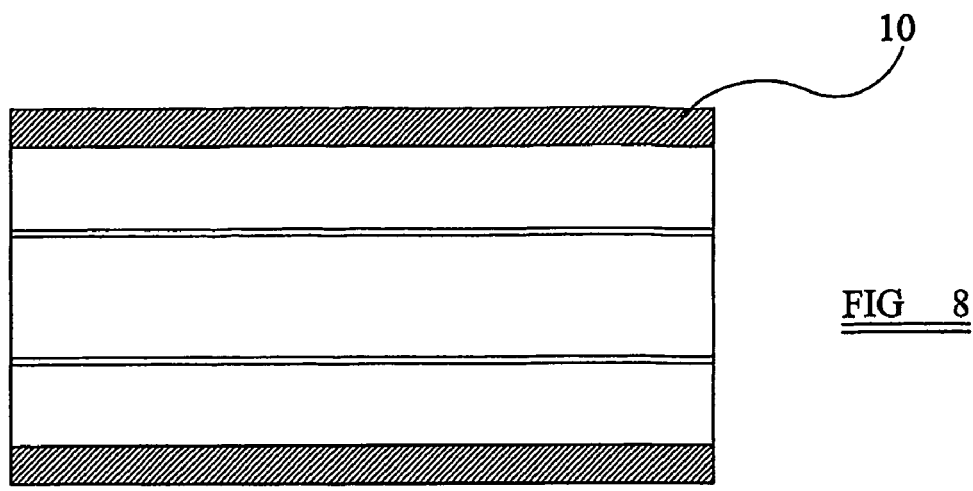
FIG. 8 is a sectional view of a rotor shown in FIG. 1.
Figure 9:
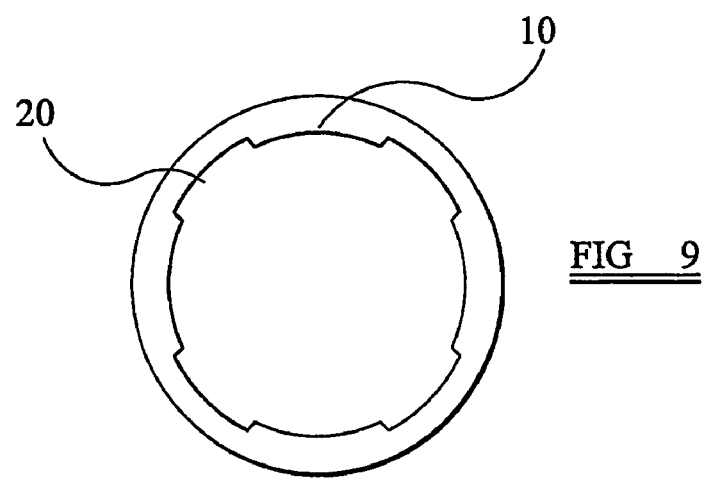
FIG. 9 is an end view of the rotor of FIG. 8.

FIGS. 8 to 10 show the rotor 10 of the torque generating apparatus in more detail. FIG. 10 shows the arrangement of the first and second assemblies define therebetween a substantially annular space for the passage of a fluid, for example drilling mud.

The rotor 10 consists of a simple steel cylinder having open grooves 20 machined to the inside surface. The grooves 20 perform two important functions. They allow the rotor 10 and stator 2 to maintain close magnetic contact and at the same time allow a sufficient flow of drilling mud through the annular space between the rotor and stator. This aids lubrication of the rotor bearings 6 and 11 and allows dissipation of heat.

The grooves 20 also prevent mud particles from aggregating within the annular space and clogging the apparatus. If the annular space were too small, mud particles would become trapped due to low mud flow velocities. The mud particles would quickly aggregate, binding the stator 2 and rotor 10 and causing a down hole failure. In conventional down hole electrical apparatus, like alternators, which use a permanent magnet rotor, failure frequently occurs due to mud material becoming trapped and clogged within the space between the rotor and stator. The clogging problem is compounded by both soft and hard magnetic particles that circulate within the mud. Once trapped by the strong magnetic fields within the permanent magnet rotor, the magnetic particles capture non magnetic mud particles, accelerating clogging. The present apparatus avoids this type of failure by providing a more generous space between rotor and stator (due to the grooves) in the area of the torque generating apparatus and by being composed of soft magnetic material which does not trap particles to the same extent as a permanent magnet.

An important feature of the torque generating apparatus is the use of electromagnetic advantage and a rotor to dissipate waste heat from work done by the apparatus. The induced currents circulating in the rotor 10 would give rise to $I^2R$ heating in the rotor raising its working temperature. However, because the rotor 10 is manufactured from a magnetically soft material, its performance is unaffected by this temperature rise. It can therefore operate in temperatures much higher than the current limit of 180 degrees Celsius, without any loss of performance. In theory, the rotor 10 alone can operate at temperatures up to the Curie temperature of the permanent magnets.

According to another realisation of the rotor 10 of the torque generating apparatus, not shown in the figures, the grooves 20 are formed with a small flute or spiral twist along their length. In this way, every rotation of the rotor 10 produces a small pumping effect, pumping mud and contaminant particles through the apparatus. These features would expel hard and soft magnetic particles which would otherwise become trapped by the permanent magnets of the alternator windings.

The pole pieces of the stator 2 and the protruding portions of the rotor inner surface are disposed so as to correspond, being aligned (in the case of a four pole apparatus) every quarter turn of the rotor 10. As discussed, the number of pole pieces and protruding portions may be varied to suit a particular application. Although the rotor 10 and stator 2 in this example are formed of magnetically soft steel, any suitable soft magnetic material may be employed. Similarly, the protective coating of the stator 2 may be made of ferrous or non ferrous material.

Normal use of the torque generating apparatus may erode the inner surface of the rotor 10 and/or the protective coating or outer surface of the stator 2. This would cause a gradual loss of output torque. The apparatus is, however, easy and economical to repair, as any mechanical errors may be easily corrected by welding, machining and/or grinding the relevant part.

Figure 11:
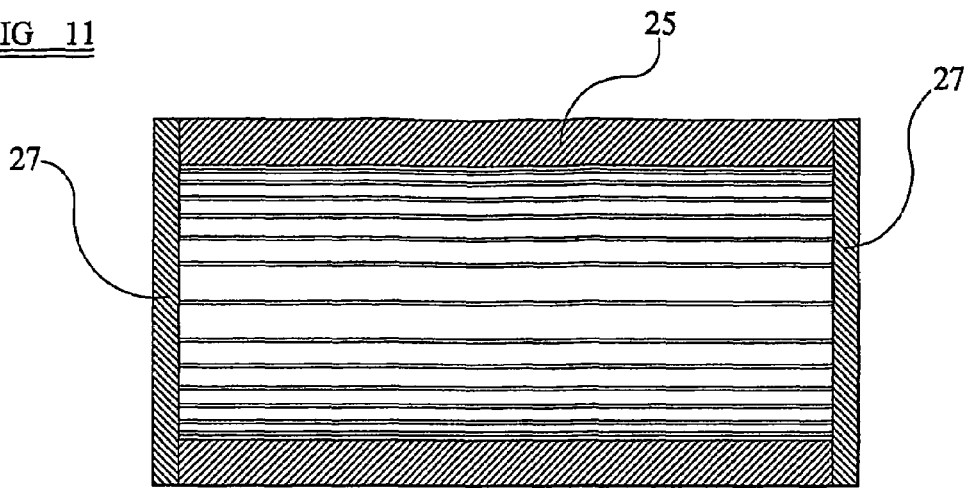
FIG. 11 is a cross sectional view of another embodiment of a rotor similar to that shown in FIG. 1 showing a laminated structure.
Figure 12:
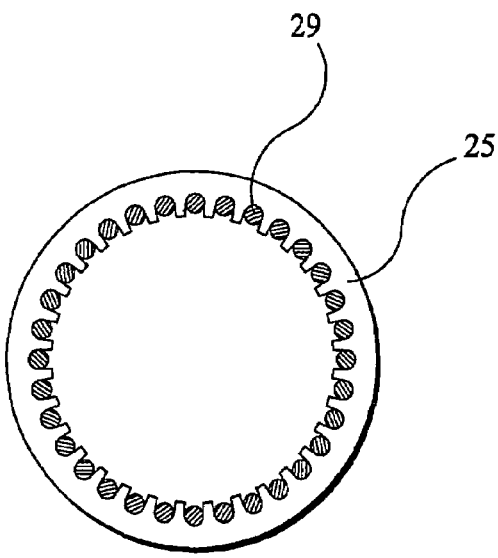
FIG. 12 is an end view of the rotor of FIG. 11 with the end cap removed.
Figure 13:
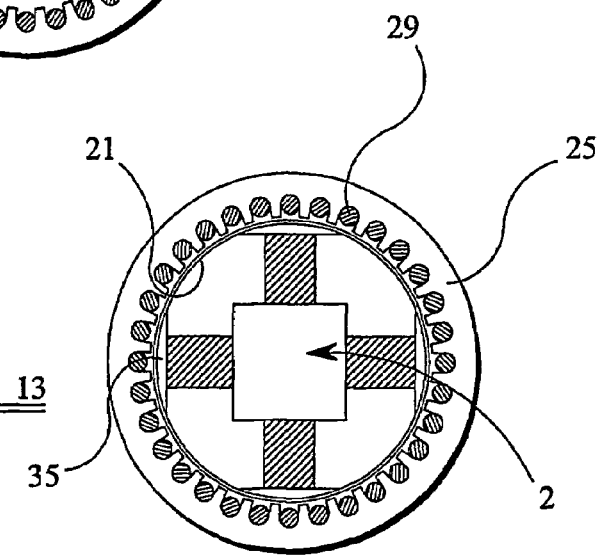
FIG. 13 is a cross sectional view detail of a rotor and stator assembly incorporating the rotor of FIGS. 11 and 12.

FIGS. 11 to 13 show an alternative rotor 25 in more detail. The rotor 25 consists of a laminated steel cylinder having a number of conductors 29 running the length of the rotor 25. The conductors 29 are connected at each end of the rotor 25 by means of a conductor end cap 27. The arrangement of conductors 29 and end caps 27 form what is known as a squirrel cage conductor winding.

The conductors 29 and conductor end caps 27 consist of rods and plates of beryllium copper, which has a similar electrical resistivity to aluminium but is a stronger material, resistant to mechanical abrasion and chemical attack from drilling muds.

FIG. 13 shows the arrangement of the first and second assemblies define therebetween a substantially annular space for the passage of a fluid, for example drilling mud.

A close magnetic contact is still maintained between the rotor 25 and the stator 2.

It should be understood that the stator which can be in a solid or laminated form can be used in conjunction with either a solid or laminated rotor.

The alternator described herein can be, for example, single phase, biphase or four phase.

FIGS. 14 to 16 show a gapped sub used in electromagnetic telemetry methods for drilling applications.

The gapped sub 65 comprises a length of a cylindrical drill collar 101 which has an electrical insulator 67 inserted at a point along its length. The gapped sub 65 is a short length of drill collar manufactured from a first portion 103 and a second portion 105 of drill collar material 101. The first portion 103 of the drill collar, the upper portion in use, is shaped such that the outside diameter is reduced to create a central pin 107. An insulator 67 is provided over the pin. The second portion 105 of the drill collar, the lower portion in use, has a recess 109 into which is inserted the pin and the insulation of the first portion. To maintain the mechanical integrity of the complete assembly, the two portions of drill collar and the insulator can be assembled using mechanical interference fitting methods supported by heat shrinking processes and/or adhesives to ensure the assembly acts as a single piece when in use. To ensure complete electrical insulation between the first and second pieces of the drill collar, an insulator 113 is also provided between the wiring channel 111 of the upper electrical connection 115 and the lower electrical connection 117 within the body of the gapped sub 65.

The gapped sub is fitted with means to allow the output of the alternator to be connected across the insulated gap, so that the alternator is able to drive signal current into the formation surrounding the gapped sub in use via two widely spaced contact points (not shown), for example areas of hard facing on the drill collar, between the gapped sub and the formation.

The ability of the alternator to automatically regulate its own output voltage and/or frequency by dynamically controlling the speed of its rotor using the torque generating apparatus means that the controllable output frequency can be exploited for electromagnetic telemetry. By connecting the output terminals of the alternator directly to the terminals of the gapped sub, communication between the surface and the end of the drill string can be achieved, via the surrounding formation.

FIG. 17 is a representation of coding and transmission schemes which can be used with a communication system according to the present invention.

37 represents an example of a piece of binary coded message, made up of a series of logical highs 39 shown as "1" and logical lows 41 shown as "0", which is to be sent by the communication system.

43 represents an electronic signal, for example Non Return to Zero (NRZ), showing the application of a voltage 45 to represent binary code "1" 39 and the application of no voltage 47 to represent binary code "0" 41.

49 represents the use of Amplitude Shift Keying (ASK) wherein the amplitude of a carrier wave is used to code digital data. The use of maximum amplitude 51 is used to represent a logical high "1" 39 and zero amplitude 53 is used to represent a logical low "0" 41.

54 represents the use of Frequency Shift Keying (FSK) wherein two separate frequencies 55, 57 are used to encode the binary message. One frequency 55 is assigned to a logical high and another frequency 57 to a logical low. By this means, digital data may be sent to the surface by transmitting an alternate series of frequencies that represent the original data. Due to practical limitations, the two frequencies are generally separated by an octave, although other separations are possible.

59 represents Phase Shift Keying wherein a coded message is sent by a 180 degree biphase encoder which assigns logical values to the relative phase of a single frequency using, for example 0 degrees to 180 degrees to represent a logical high, and 180 degrees to 360 degrees to represent a logical low. The data to be transmitted is encoded into abrupt 180 degree phase changes 60 of the single carrier wave from the alternator every time there is a change in digital data, for example from a high to a low, or from a low to a high. Depending on the logical value of the coded message to be sent the relative phase of the frequency can be used for transmission.

61 represents Phase Shift Keying wherein a coded message is being sent by a 90 degree quadphase encoder which has higher coding efficiency than a biphase encoder by, for example, assigning data bits 00 to phase 0 degrees to 90 degrees, data bits 01 to phase 90 degrees to 180 degrees, data bits 10 to phase 180 degrees to 270 degrees, and data bits 11 to phase 270 degrees to 360 degrees. Depending on the value of the coded message to be sent the relative phase of the frequency can be used for transmission.

Phase Modulation using the alternator is possible by designing the alternator with as many phases as required to encode the data. Therefore a 180 degree biphase encoder would use a two phase alternator. A more complex, two bit, 90 degree quadphase encoder would use a four phase alternator. This process could be used to include a three bit, 45 degree, eight phase alternator, but this machine would be complex to build and could be unreliable in the field. The practical limit for this machine is likely to be four phases allowing a 90 degree encoding strategy.

Figure 18:
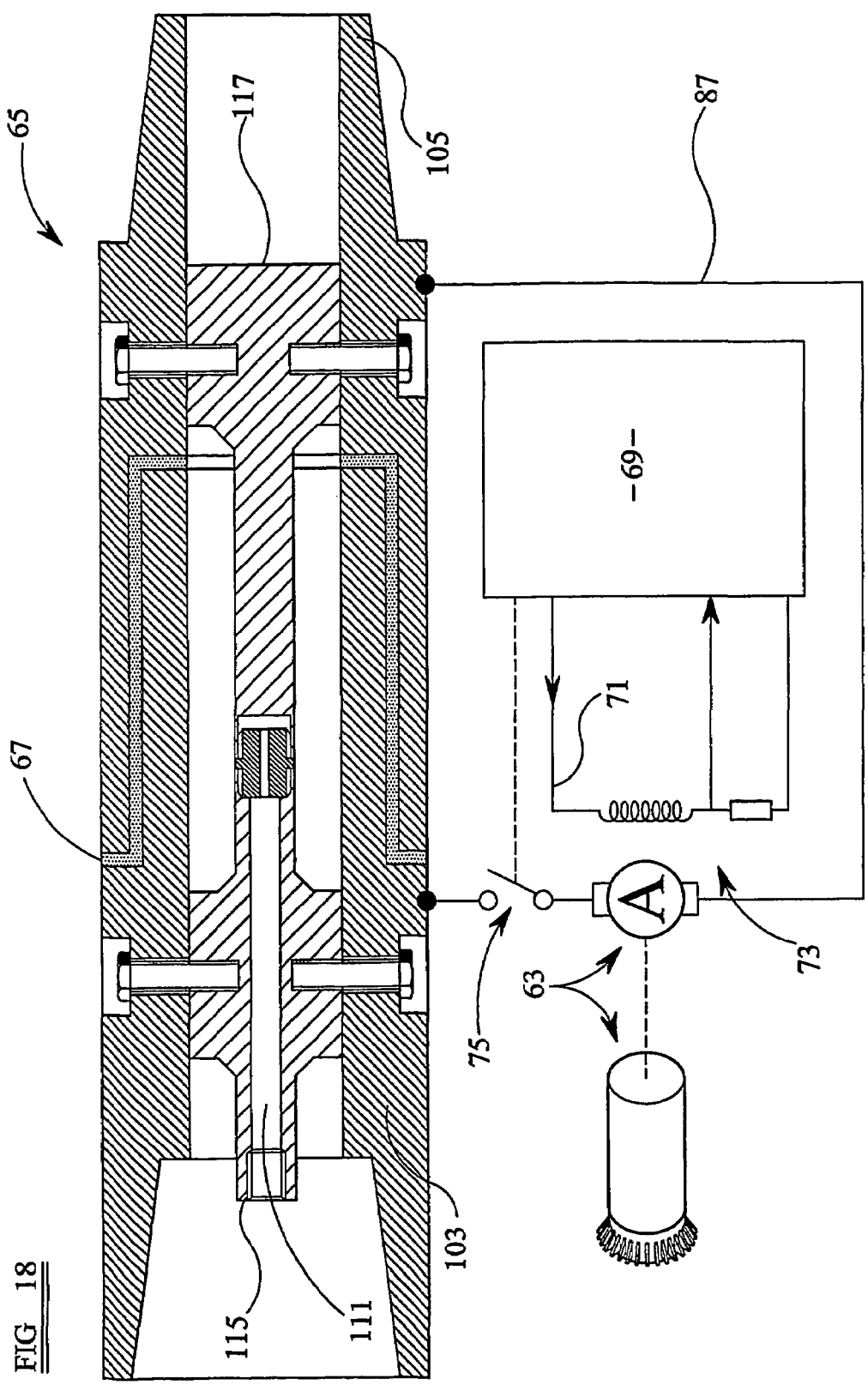
FIG. 18 is a schematic of a first embodiment of an electronic connection between an alternator and a gapped sub in a communication apparatus according to the present invention.

FIG. 18 is a schematic illustration of a first embodiment of an electronic connection between a single phase alternator 63 and a gapped sub 65. AC current from the alternator, prior to any rectification means, is electrically connected to the gapped sub across the insulated gap 67. The circuit is completed by means of an electrically conducting wire running from the upper electrical connection 115, through the wiring channel 111 to the lower electrical connection 117. The alternator is regulated to a required voltage and/or frequency output by means of a microprocessor and alternator regulation control module 69 which controls the feedback loop of braking current 71 through the torque generating apparatus 73 such that a constant rotor speed is maintained.

The output frequency of the alternator can be indirectly determined by measuring the output voltage of the alternator, and can then be regulated by the microprocessor.

Alternatively direct regulation of the required output frequency by the microprocessor may be used wherein the microprocessor sets a reference frequency and the mud flow alternator is permitted to rotate until the required frequency is achieved, at which point the microprocessor applies a steady braking force to maintain the required frequency.

Figure 19:
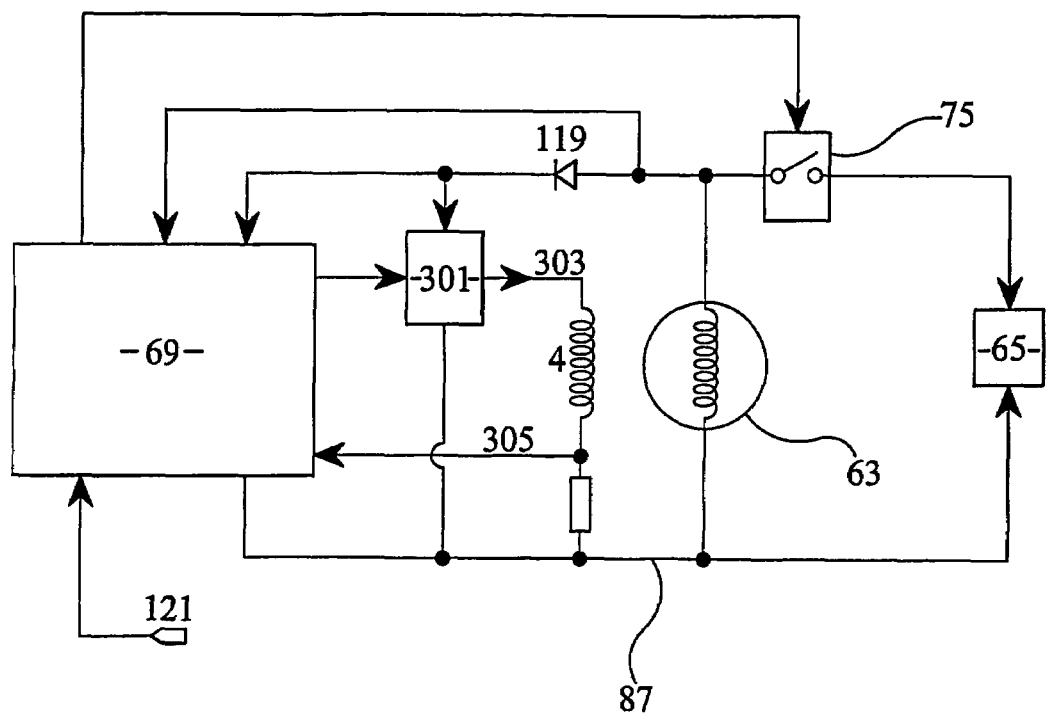
FIG. 19 is a further schematic of the electrical connection of FIG. 18.

FIG. 19 shows a schematic of the electrical connection between the single phase alternator and the gapped sub which is used to draw instrument power from the alternator and control the same alternator for electromagnetic telemetry applications. As described hereinbefore FIG. 19 also shows the braking control loop between the microprocessor 69, the switch mode controller and the stator windings 4. The output voltage generated by the alternator 63 is drawn off via a rectifier diode 119 to power the microprocessor 69, and the electromagnetic brake via the switch mode controller 301. When required, the microprocessor 69 converts raw steering and survey data 121 into digital coded data which is transmitted by operating a microprocessor controlled switch 75 at appropriate times to connect the alternator 63, via the formation, to receiving means at the surface, for example amplifiers, timing means and/or microprocessors. The methods of encoding and transmission are selected from Amplitude Shift Keying (ASK), Frequency Shift Keying (FSK), or Pulse Position Modulation (PPM).

Using the single microprocessor controlled switch 75, for example a semiconductor or electromechanical switch, the alternator output can be used to transmit data to the surface by being switched across the gapped sub when the digital data is high and disconnected when the data is low. The communication frequency could be selected prior to transmission by programming the alternator, via the communication link of the microprocessor, to run at a constant speed. As such the arrangement would be utilised for Amplitude Shift Keying. Alternative methods of selecting or changing the communication frequency could also be used.

To transmit data to the surface using Frequency Shift Keying, the alternator is controlled by the microprocessor 69 to switch between two speeds and hence create two frequencies in line with the data to be transmitted. The single microprocessor controlled switch 75 is provided to disconnect the alternator from the gapped sub to terminate transmission. Frequency Shift Keying has a better signal to noise ratio than Amplitude Shift Keying, therefore the use of Frequency Shift Keying would allow data to be recovered from more difficult and electrically noisy drilling conditions.

The arrangement in FIGS. 18 and 19 is also used for Pulse Position Modulation (PPM) which is similar to Amplitude Shift Keying (ASK) except more emphasis is assigned to the relative time intervals between detected pulses. The original digital survey data is encoded as time intervals between pulses and is decoded on the surface by accurately measuring the time intervals to reconstruct the original digital survey data as transmitted. Using the single microprocessor controlled switch 75, the output of the alternator is switched across the gapped sub in the appropriate sequence producing bursts of the carrier wave spaced over time to form the encoded data. This is a much more subtle coding strategy than Amplitude Shift Keying in that it has reduced communication speed but has increased power efficiency.

Figure 20:
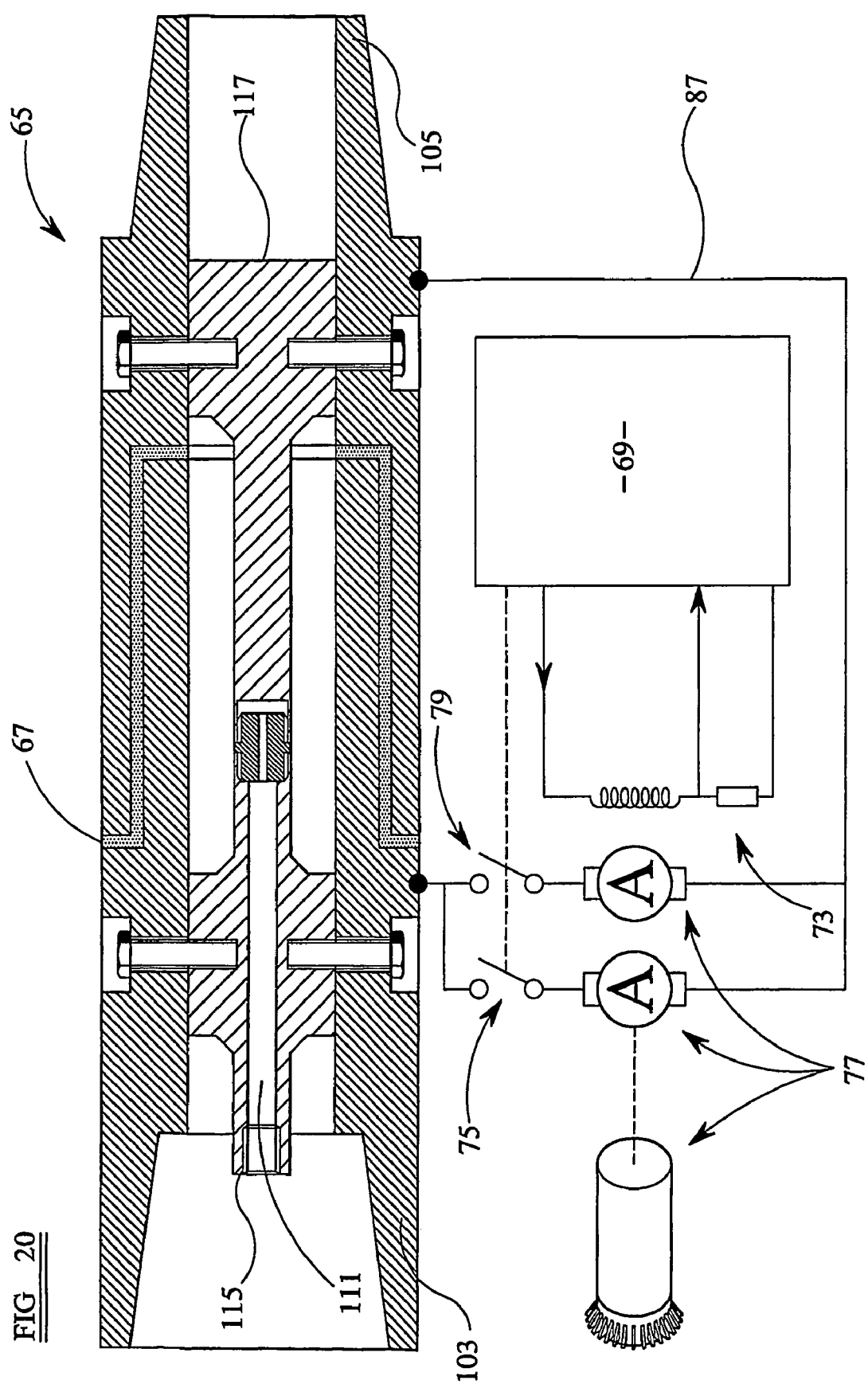
FIG. 20 is a schematic of a second embodiment of an electronic connection between an alternator and a gapped sub in a communication apparatus according to the present invention.

FIG. 20 is a schematic illustration of an electronic connection between a double wound alternator 77, forming a biphase alternator, and a gapped sub 65 in a communication apparatus according to the present invention.

The biphase alternator 77 is electrically connected to the gapped sub across the insulated gap. AC current from the alternator, prior to any rectification means, is electrically connected to the gapped sub across the insulated gap 67. The circuit is completed by means of an electrically conducting wire running from the upper electrical connection 115, through the wiring channel 111 to the lower electrical connection 117. The output of the biphase alternator is regulated in the same manner as for the single phase alternator by means of a microprocessor and alternator regulation control module 69 which controls the feedback loop of the torque generating apparatus 73 such that a constant rotor speed is maintained.

Figure 21:
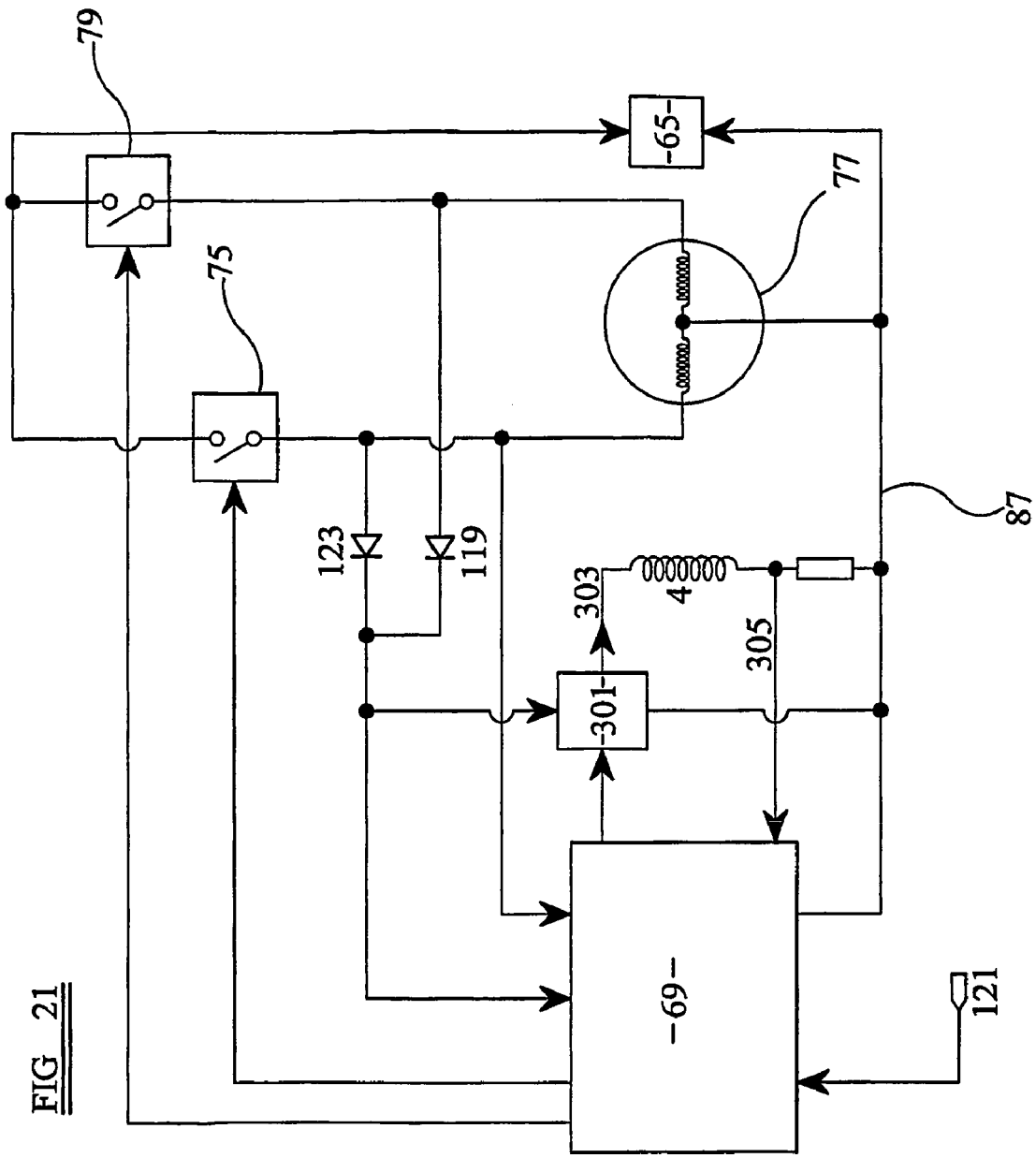
FIG. 21 is a further schematic of the electrical connection of FIG. 20.

FIG. 21 shows a schematic of the electrical connection between the biphase alternator and the gapped sub which is used to draw instrument power from the alternator and control the same alternator for electromagnetic telemetry applications. As described hereinbefore FIG. 21 also shows the braking control loop between the microprocessor 69, the switch mode controller and the stator windings 4. The output voltage generated by the biphase alternator 77 is drawn off via rectifier diodes 119, 123 to power the microprocessor 69 and the electromagnetic brake. When required, the microprocessor 69 converts raw steering and survey data 121 into digital coded data which is transmitted by operating microprocessor controlled switches 75, 79 at appropriate times to connect the alternator 77, via the formation, to receiving means at the surface, for example amplifiers, timing means and/or microprocessors.

The two alternator phases are brought out to the microprocessor controlled switches 75, 79 with an electrical neutral 87 wired to the lower portion 105 of the gapped sub.

Using this arrangement digital data can be encoded and transmitted to the surface using Phase Shift Keying wherein the data to be transmitted is encoded into abrupt 180 degree phase changes of the single carrier wave from the alternator every time there is a change in digital data, for example from a high to a low, or from a low to a high. Each of the two phases of the alternator are connected via a separate microprocessor controlled switch 75, 79 to the same side of the insulated gap of the gapped sub. Depending on which phase is required to produce a portion of the encoded message the appropriate switch is closed whilst the switch for the other phase is opened. To terminate transmission both of the switches 75, 79 are opened.

Figure 22:
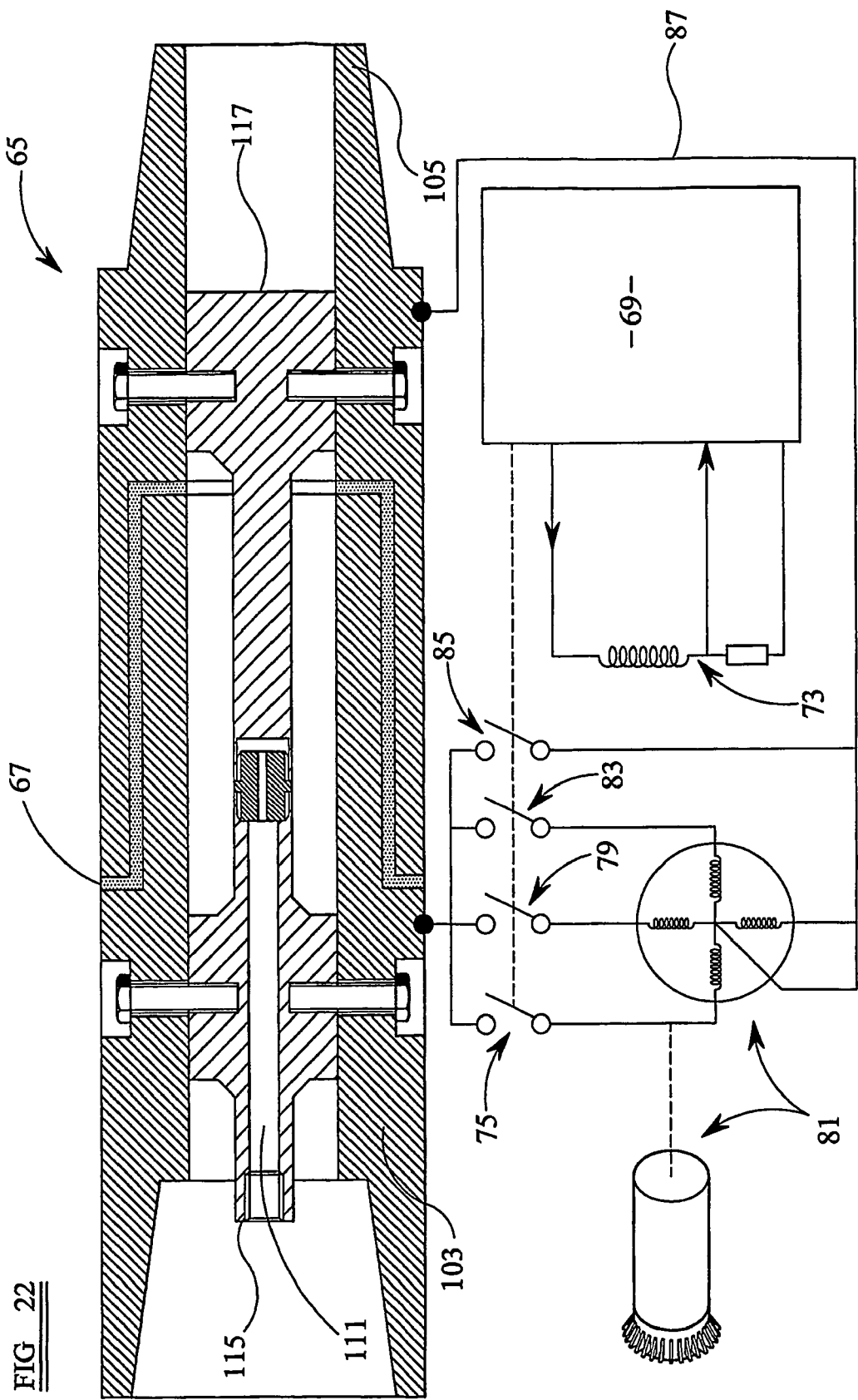
FIG. 22 is a schematic of a third embodiment of an electronic connection between an alternator and a gapped sub in a communication apparatus according to the present invention.

FIG. 22 is a schematic illustration of an electronic connection between a four phase alternator 81 and a gapped sub 65 in a communication apparatus according to the present invention. AC current from the alternator, prior to any rectification means, is electrically connected to the gapped sub across the insulated gap 67. The circuit is completed by means of an electrically conducting wire running from the upper electrical connection 115, through the wiring channel 111 to the lower electrical connection 117.

Figure 23:
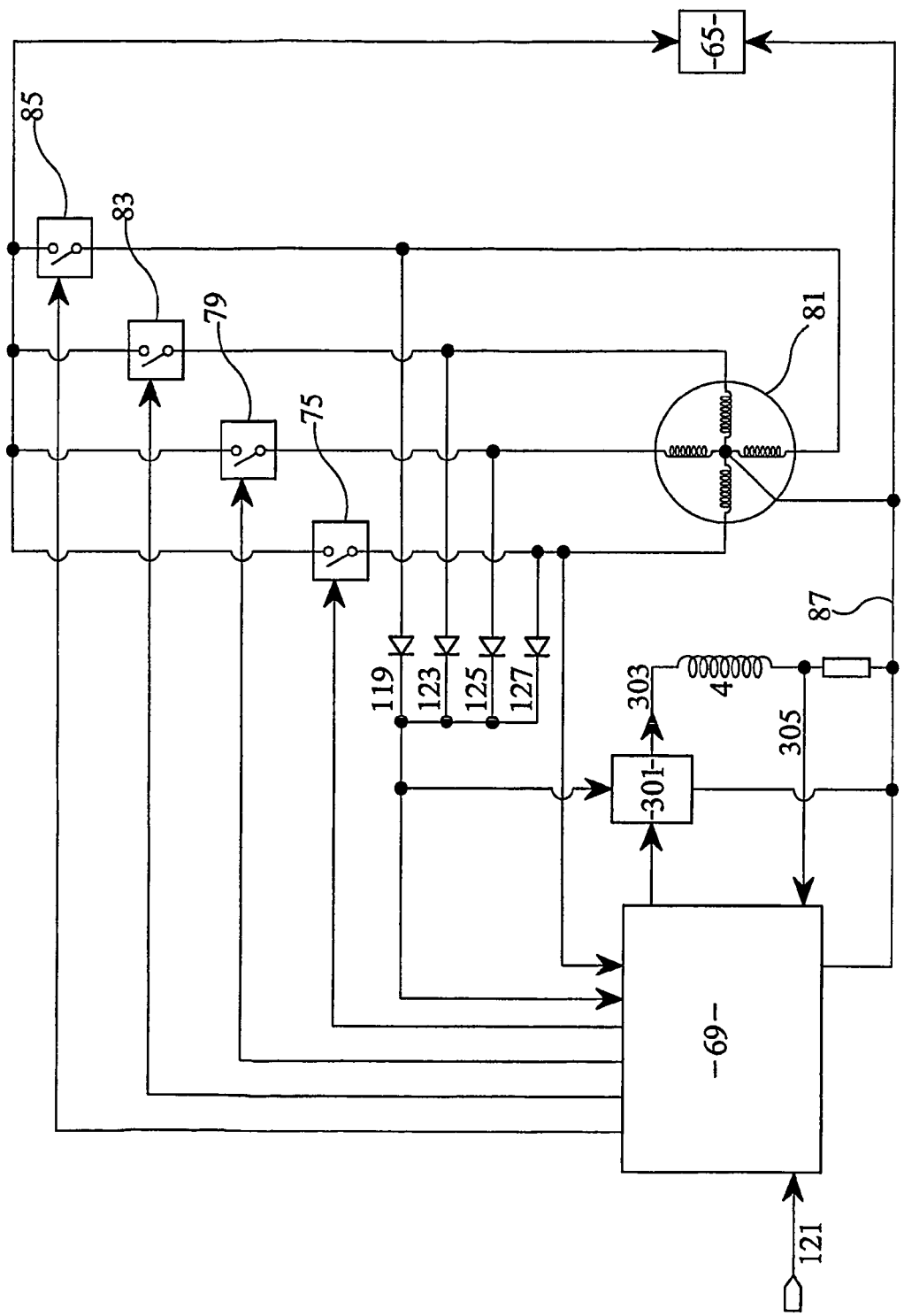
FIG. 23 is a further schematic of the electrical connection of FIG. 22.

FIG. 23 shows a schematic of the electrical connection between the four phase alternator and the gapped sub which is used to draw instrument power from the alternator and control the same alternator for electromagnetic telemetry applications. As described hereinbefore FIG. 23 also shows the braking control loop between the microprocessor 69, the switch mode controller and the stator windings 4. The output voltage generated by the alternator 81 is drawn off via rectifier diodes 119, 123, 125, 127 to power the microprocessor 69 and the electromagnetic brake. When required, the microprocessor 69 converts raw steering and survey data 121 into digital coded data which is transmitted by operating microprocessor controlled switches 75, 79, 83, 85 at appropriate times to connect the alternator 81, via the formation, to receiving means at the surface, for example amplifiers, timing means and/or microprocessors.

Using this arrangement, digital data can be encoded and transmitted to the surface using Phase Shift Keying wherein the data to be transmitted is encoded into abrupt 90 degree phase changes of the single carrier wave from the alternator every time there is a change in digital data, for example by assigning data bits "00" to phase 0 degrees to 90 degrees, data bits "01" to phase 90 degrees to 180 degrees, data bits "10" to phase 180 degrees to 270 degrees, and data bits "11" to phase 270 degrees to 360 degrees.

All four of the alternator phases are brought out to the microprocessor controlled switches 75, 79, 83, 85 with an electrical neutral 87 wired to the lower portion 105 of the gapped sub. In response to the digital data to be transmitted, the appropriate phase of the alternator is connected to the upper portion 103 of the gapped sub in sequence, such that the appropriately phase shifted carrier wave is transmitted through the formation. All of the microprocessor controlled switches 75, 79, 83, 85 are opened together to terminate transmission.

Figure 24:
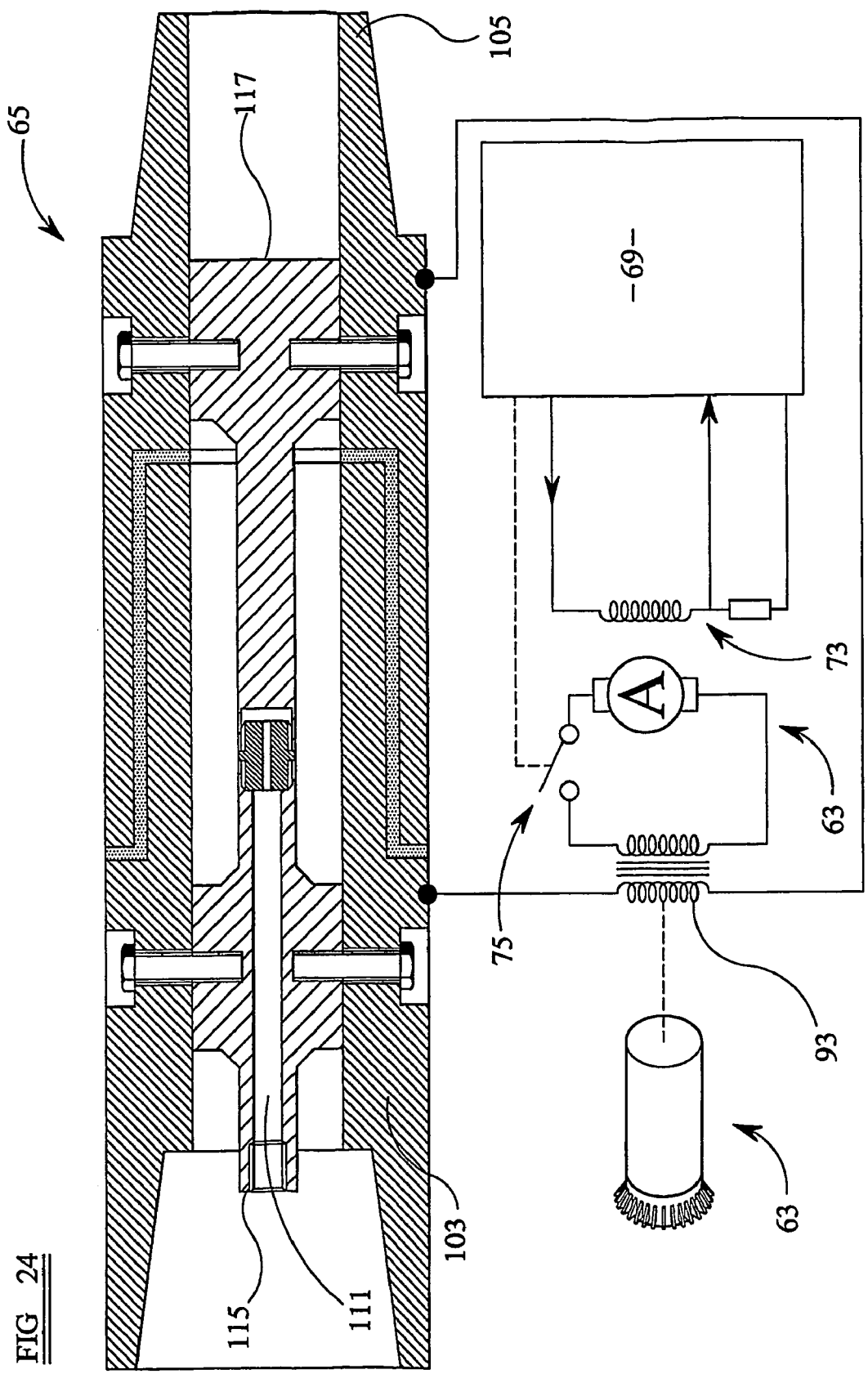
FIG. 24 is a schematic of a fourth embodiment of an electronic connection between an alternator and a gapped sub in a communication apparatus according to the present invention.

FIG. 24 is a schematic illustration of an electronic connection between a single phase alternator 63 and a gapped sub 65 in a communication apparatus according to the present invention wherein at least one transformer 93 is added to the alternator to enable the impedance of the alternator to match the impedance of the surrounding formation (not shown). The alternator as described hereinbefore is electrically connected to the gapped sub across the insulated gap. The alternator is regulated to a required voltage and/or frequency output by means of a microprocessor and alternator regulation control module 69 which controls the feedback loop of the torque generating apparatus 73 such that a constant rotor speed is maintained. Although the microprocessor controlled switch 75 is shown in FIG. 24 on the alternator side of the alternator/transformer arrangement, it should be appreciated that the switch 75 could also be placed on the transformer side of the arrangement.

The arrangement shown in FIG. 24 allows digital data to be encoded and transmitted to the surface using any of the methods Amplitude Shift Keying (ASK), Frequency Shift Keying (FSK), or Pulse Position Modulation (PPM) as described hereinbefore.

It should be understood that where multiphase alternators are used, corresponding numbers of transformers can be provided to correct the output impedance of the alternator.

The conductivity of a formation may vary, for example from 10 Seimens/meter to 0.001 Seimens/meter and, whilst it would be impossible to dynamically match the output impedance of an alternator to every possible formation impedance, the addition of an impedance matching transformer for a selected range could improve the power transferred from the alternator to the formation and hence the level of signal detected at the surface.

Overall, the advantage of using an alternator with the ability to automatically regulate its own output voltage and/or frequency by dynamically controlling the speed of its rotor means that nominally ten times more power can be transmitted into the formation compared to the power of a battery powered signal generator. The additional power supplied means that the communication range possible by this communication system is extended, for example twice, compared with current methods.

As previous described an important feature of the torque generating apparatus of the communication system is the use of electromagnetic advantage and a rotor to dissipate waste heat from work done by the apparatus. In effect the communication system uses heat dissipating apparatus rather than heat generating apparatus.

The induced currents circulating in the rotor would give rise to $I^2R$ heating in the rotor raising its working temperature. However, because the rotor is manufactured from a magnetically soft material, its performance is unaffected by this temperature rise. In theory, the rotor alone can operate at temperatures up to the Curie temperature of the permanent magnets. The ability of the alternator/torque generating apparatus of the communication system to operate at higher temperatures means that power can be supplied to the gapped sub at temperatures which would normally cause battery powered signal generating apparatus to fail.

As the alternator derives its primary power from the passage of flowing mud it is independent of the batteries that are used to power existing electronic signal generators for gapped subs and additional down hole instrumentation. With the addition of a local voltage regulator the alternator could be used to power the down hole instrumentation removing the need for the provision of batteries down hole.

The invention claimed is:

1. A communication system for down hole use and comprising:
   a drill collar (101) comprising a first portion (103) and a second portion (105) separated from each other by an electrically insulating material;
   an alternator (22, 63, 77, 81), an output of which is electrically connected to each of the first and second portions of the drill collar (101) so as to transmit an electrical signal represented by the output of the alternator into a geological formation being drilled;
   switch means (75, 79, 83, 85) for controlling transmission of the electrical signal to the drill collar (101); and
   torque generating apparatus (2, 4, 10) which generates torque in response to the electrical output of the alternator and which is mechanically connected to the alternator for transmitting such torque to the alternator for regulating rotation thereof.

2. A communication system as claimed in claim 1, wherein the torque generating apparatus comprises a first assembly (10, 25) including a generally cylindrical member of magnetically soft material and having a longitudinal axis, a second assembly (2) arranged coaxially within the first assembly and including an electromagnetic winding (4), the first assembly and the second assembly being rotatable relative to each other about the axis, the arrangement being such that relative rotation between the first and second assemblies induces a magnetic field which generates rotational torque between the first and second assemblies.

3. A communication system as claimed in claim 2, wherein the first assembly is a rotor assembly (10, 25) of the torque generating apparatus for producing rotational torque and the second assembly (2) is a stator assembly of the torque generating apparatus.

4. A communication system as claimed in claim 2, wherein rectification means (31) is provided to convert the electrical output from the alternator to provide D.C. current to the electromagnetic winding (4) of the torque generating apparatus to generate an electromagnetic braking effect.

5. A communication system as claimed in claim 4, wherein the electrical output of the alternator (22, 63, 77, 81) is connected indirectly to the electromagnetic winding (4) of the torque generating apparatus by way of alternator voltage regulation means to create the electromagnetic braking effect.

6. A communication system as claimed in claim 5 wherein the alternator voltage regulation means functions to provide a progressive braking effect.

7. A communication system as claimed in claim 5 wherein the alternator voltage regulation means functions to effect braking at a predetermined set point.

8. A communication system as claimed in claim 1, wherein the regulated rotation of the alternator speed produces a substantially constant output voltage signal from the alternator.

9. A communication system as claimed in claim 1, wherein the regulated rotation of the alternator produces a substantially constant output frequency signal from the alternator.

10. A communication system as claimed in claim 1 wherein the at least one switch comprises a semiconductor switch.

11. A communication system as claimed in claim 1 wherein the at least one switch comprises an electromechanical switch.

12. A communication system as claimed in claim 1, wherein a microprocessor (69) is provided to control the at least one switch.

13. A communication system as claimed in claim 1 and including coding means to transmit data to receiving means at a region outside the geological formation.

14. A communication system as claimed in claim 13, wherein the coding means is selected from Amplitude Shift Keying, Frequency Shift Keying, Pulse Position Modulation and Phase Shift Keying.

15. A communication system as claimed in claim 13 wherein the receiving means comprises at least one amplifier.

16. A communication system as claimed in claim 13, wherein the receiving means comprises timing means.

17. A communication system as claimed in claim 13, wherein the receiving means comprises at least one microprocessor.

18. A communication system as claimed in claim 1, wherein the communication system comprises at least one transformer (93) such that the impedance of the electrical signal can be altered.

* * * * *